US009863397B2

(12) United States Patent
Haikalis

(10) Patent No.: US 9,863,397 B2
(45) Date of Patent: Jan. 9, 2018

(54) MACHINE FOR GENERATING POWER BY ROTATING METAL PINWHEELS VIA HYDRAULIC AND GRAVITATIONAL FORCES

(71) Applicant: Andreas Haikalis, Astoria, NY (US)

(72) Inventor: Andreas Haikalis, Astoria, NY (US)

(*) Notice: Subject to any disclaimer, the term of this patent is extended or adjusted under 35 U.S.C. 154(b) by 402 days.

(21) Appl. No.: 14/520,301

(22) Filed: Oct. 21, 2014

(65) Prior Publication Data
US 2016/0108886 A1    Apr. 21, 2016

(51) Int. Cl.
*F03G 3/02* (2006.01)
*F03B 17/00* (2006.01)
*F03G 7/10* (2006.01)

(52) U.S. Cl.
CPC ............ *F03B 17/005* (2013.01); *F03G 7/10* (2013.01)

(58) Field of Classification Search
CPC .......... F03B 17/005; F03B 17/02; F03G 7/10; F03G 3/00; Y02E 10/223
See application file for complete search history.

(56) References Cited

U.S. PATENT DOCUMENTS

| 980,666 | A | * | 1/1911 | Overfield | F03B 7/003 60/639 |
| 2,060,414 | A | * | 11/1936 | Fladeland | F03B 3/00 415/69 |
| 2,850,261 | A | * | 9/1958 | Rutkove | F03B 17/02 416/101 |
| 3,360,926 | A | * | 1/1968 | Parr | F03B 17/02 200/81 R |
| 4,001,596 | A | * | 1/1977 | Kurtzbein | F03B 13/145 290/53 |
| 4,151,719 | A | * | 5/1979 | Boots | F03B 7/006 415/5 |
| 4,280,789 | A | * | 7/1981 | Graden | F03B 13/00 415/6 |
| 4,385,497 | A | * | 5/1983 | Scott | F03B 7/003 415/916 |
| RE31,449 | E | * | 11/1983 | Crider | F03B 3/08 290/43 |
| 5,174,724 | A | * | 12/1992 | Ammons | F03D 3/065 290/44 |

(Continued)

FOREIGN PATENT DOCUMENTS

KR    WO 2010024554 A2 *   3/2010   ............. F03G 3/00

*Primary Examiner* — Michael Zarroli
(74) *Attorney, Agent, or Firm* — Sofer & Haroun, LLP

(57) ABSTRACT

A machine for generating power by rotating metal pinwheels via hydraulic and gravitational forces. The metallic pinwheel structure is made from six to eight metal embedded projectiles projecting 20 feet outward from a closed metallic circular pool structure. Metallic pinwheel structures are installed on a seven inch perforated metal pipe that acts as an axle. A 150 gal tank filled with any fluid provides the fuel source for the motor. A water pump circulates the fluid through out the closed piping network with out any fluid loss. Barrel structures attached to the ends of the projectiles are top filled by the pumped fluids. The Fluid filled barrels become heavy when filled and exert downward forces with the assistance of gravity rotating the pinwheel structure. While the pinwheel structure is rotating a wired transmission and motor wired near the axle connects to a generator producing power.

1 Claim, 2 Drawing Sheets

(56) References Cited

U.S. PATENT DOCUMENTS

| | | | | |
|---|---|---|---|---|
| 5,755,553 | A * | 5/1998 | Laemthongsawad | F03B 7/003 290/54 |
| 6,210,113 | B1 * | 4/2001 | Ihrenberger | F03B 7/003 415/141 |
| 7,222,487 | B1 * | 5/2007 | Hinkley | F03G 7/10 290/43 |
| 8,151,565 | B2 * | 4/2012 | Carrion-Torres | F03B 17/02 290/42 |
| 8,686,585 | B2 * | 4/2014 | Lin | F03B 7/003 290/54 |
| 8,763,386 | B2 * | 7/2014 | Greene | F03B 17/00 290/54 |
| 2005/0052028 | A1 * | 3/2005 | Chiang | F03B 17/005 290/1 R |
| 2014/0077497 | A1 * | 3/2014 | Letang | F03B 13/00 290/54 |
| 2016/0108898 | A1 * | 4/2016 | Haikalis | F03G 3/02 290/1 A |

* cited by examiner

MACHINE FOR GENERATING POWER BY ROTATING METAL PINWHEELS VIA HYDRAULIC AND GRAVITATIONAL FORCES

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of mechanical and hydraulic green energy production and more specifically to a machine for generating power by rotating metal pinwheels via hydraulic and gravitational forces.

The pinwheel motion motor relates mostly, to the field of green energy production, and saving the environment from bad emissions. Historically green energy production has involved the use of the sun, the wind, and the river currents to assist in the safe production of energy. This motor is not reliant on these factors. It uses pumped fluids as weights to generate momentum and rotation with the assistance of gravitational forces that are always present. These forces turn pinwheel structures in clockwise and counterclockwise directions generating kinetic energy.

Green energy technology over the years involved the development and refinement of windmills, solar panels, dams, and water current driven mills. This invention falls into this category and most relates to the water current driven mills. However this invention has one important deviation. This invention generates its own water current by using a closed piping network to funnel water to its desired location where it will be deployed as a weight to turn the pinwheel. This invention is not reliant on natural environmental water currents nor has to be near the water. This feature makes the invention self sufficient and portable.

Prior technologies are too reliant on the forces of nature. These forces are wind, water current, and the sun. If there is not enough sun, then solar panels do not work well. Without gusts of wind or wind currents then windmills cannot produce energy effectively. If there is not a constantly flowing water mass, mills will not work. The invention only requires the filling of its 150 gallon tank by any fluid. A pump circulates the fluid throughout the machine, and returns it back into the 150 gallon tank for its reuse. There is no fluid loss so this machine is portable and can be situated in any environment.

BRIEF SUMMARY OF THE INVENTION

The primary object of the invention is it Provides a consistent balanced and powerful energy source with out harming the environment.

Another object of the invention is it can be easily assembled and disassembled.

Another object of the invention is it can be made from recycled metals and eco friendly products.

A further object of the invention is it can fulfill the energy production needs of both residential and commercial users.

Yet another object of the invention is its Low maintenance low costs to run and no waste.

Still yet another object of the invention is its Not reliant on uncontrollable inputs such as light, wind, or water currents.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for generating power by rotating metal pinwheels via hydraulic and gravitational forces comprising: A metallic pinwheel structure made from six to eight metal embedded projectiles projecting 20 feet outward from a closed metallic circular pool structure. The Metallic pinwheel structures are installed on a seven inch perforated metal pipe that acts as an axle. It runs the entire length of the machine. A 150 gal tank filled with any fluid provides the fuel source for the motor. A water pump circulates the fluid out of the tank through out the closed piping network with out any fluid loss. Barrel structures attached to the ends of the projectiles are top filled by the pumped fluids. The Fluid filled barrels become heavy when filled and exert downward forces with the assistance of gravity rotating the pinwheel structure clockwise or counterclockwise. The barrels empty their contents back into the tank as the pinwheel turns so there is no fluid loss at all. While the pinwheel structure is rotating a wired transmission and motor situated near the axle connects to a generator producing power. The generator is installed at the front of the machine motor.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
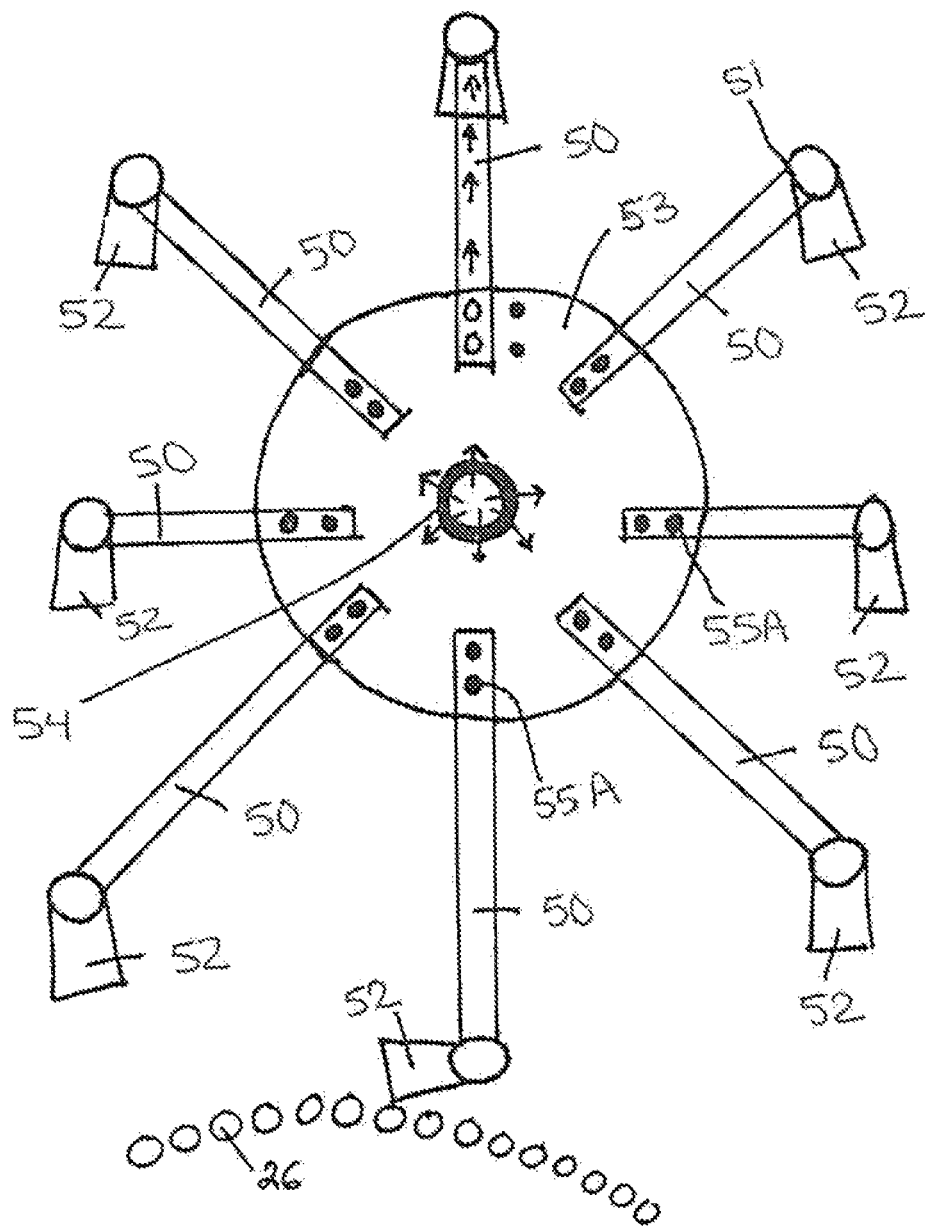
FIG. 1 is a left end side view the arrangement of machine of FIG. 2 in accordance with one embodiment of the invention.
Figure 2:
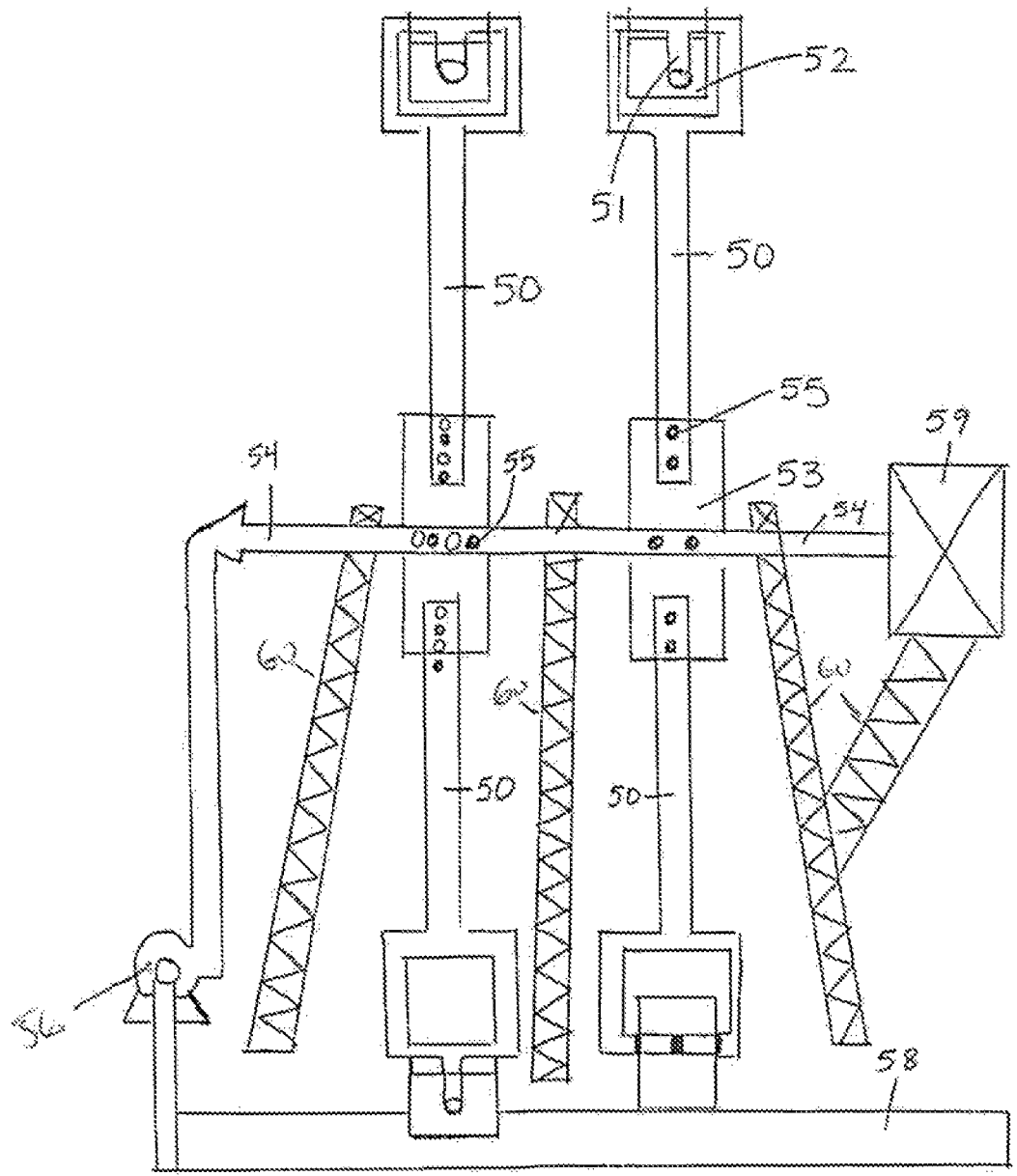
FIG. 2 is a side view of the machine in accordance with one embodiment of the invention.

The machine has a 150 gallon tank (FIG. #58) at its base that is manually filled by any fluid provided the fluid is able to flow through pipe structures (FIG. 2 #57). Once the tank is filled, the fluid leaves the tank and up a 7 inch metal pipe that runs perpendicular to the tank when an attached fuel cell water pump (FIG. 2 #56) is turned on via a switch at the back end of the motor structure. The water flows past pump 56 up to a height of 25 feet, then it gets directed through another 7 inch pipe that runs parallel to the tank. This parallel pipe acts as a giant axle (#54) supported by a support structure 60. Equidistantly on this parallel running pipe are 4 inch perforated holes that act as valves for water to flow through (#55). At these regions metallic pinwheel structures are installed. The center of these pinwheels (#53) comprises of a sealed waterproof discus structure that acts as a reservoir for the pumped water from the perforated parallel pipe (#54) to empty into. The discus structure can be made from any metal. Along the circumference of the disc structure are eight sealed insertion points where 20 foot steel pipes extend outward from the discus (#50). Flap covered perforations (55A) at the base of these 20 foot pipes allow fluid to flow outwardly and away from the disc reservoir pinwheel structure (#53). At the end of each of these 20 foot pipe structures is a spout (#51) that allows the fluid pumped to empty into a 10-50 gallon barrel like structure (#52) that is affixed to the end of the 20 foot projectiles by a flexible metal bracket or joint that allows the barrel structure to tilt. The 20 foot projectiles above the axle pipe (#54) fill first (3, 12, 9 clock positions). Once the barrel structures 52 at the very end of the projectiles 50 get filled, they become heavy and gravitational forces turn the entire pinwheel structure 53/54 clockwise or counterclockwise. The 20 foot projectiles 52 can only fill at the 3.9, and 12 o'clock positions. A louver mechanism opens the flap covered valves (55A) at these positions only. As the pinwheel turns the fluid filled barrels (#52) tilt and empty their contents back into the 150 gallon tank (#58) at the 6 o'clock position by grazing a wheel structure (##26) that rests directly above the 150 gallon tank. The fluid is then pumped back up again into the 7 inch piping network 57. This process is continuously repeated. While the pinwheel structure is rotating, a wired transmission and 3 hp motor 59 situated near the axle (#54) is part of a generator structure (#59) that produces conservatively 300 kw of power for every pinwheel structure installed along the axle 54. In this machine design 6 to 8 pinwheel structures (2 shown in FIG. 2) can be installed along the axle 54 elongating the machine motor to varying lengths.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for generating power comprising
one or more metallic pinwheel structures, each of which include a plurality of tubular metal embedded projectiles projecting radially outward from a perforated metal pipe;
that acts as an axle for each of said pinwheel structures;
a fluid tank filled with a fluid;
a pump coupled to said fluid tank and said perforated metal pipe acting as an axel circulates the fluid from said fluid tank to said perforated metal acting an axle and into said tubular metal embedded projectiles;
barrel structures attached to the ends of the tubular metal projectiles are configured to receive said fluid from said pump and fluid tank; and
when said barrel structures become heavy when filled with said fluid, they exert a downward force rotating said one or more pinwheel structures, wherein when said pinwheel structures are rotating said perforated metal pipe acting as an axle, a wired transmission and motor wired near the axle connects to a generator producing power.

* * * * *